United States Patent
Magni

(10) Patent No.: US 7,506,918 B2
(45) Date of Patent: Mar. 24, 2009

(54) MANEUVERING SEAT FOR TELESCOPIC LIFTS

(75) Inventor: Riccardo Magni, Modena (IT)

(73) Assignee: Manitou Costruzioni Industriali S.r.l., Castelfranco Emilia (IT)

( * ) Notice: Subject to any disclaimer, the term of this patent is extended or adjusted under 35 U.S.C. 154(b) by 0 days.

(21) Appl. No.: 11/784,574

(22) Filed: Apr. 6, 2007

(65) Prior Publication Data

US 2007/0241583 A1    Oct. 18, 2007

(30) Foreign Application Priority Data

Apr. 14, 2006   (IT)  .................. MO2006A0125

(51) Int. Cl.
*B60R 27/00* (2006.01)
(52) U.S. Cl. ............... 296/190.08; 296/190.11; 296/65.06; 296/65.07; 297/240
(58) Field of Classification Search ............ 296/65.06, 296/65.07, 190.08, 190.11; 297/344.21, 297/240, DIG. 10
See application file for complete search history.

(56) References Cited

U.S. PATENT DOCUMENTS

| | | | | |
|---|---|---|---|---|
| 1,803,063 A * | 4/1931 | Hultgren | ................ | 297/344.22 |
| 1,916,800 A * | 7/1933 | Hultgren | ..................... | 297/340 |
| 2,148,187 A * | 2/1939 | Burnham | .................... | 248/425 |
| 2,200,904 A * | 5/1940 | Van Derveer et al. | ....... | 248/425 |
| 3,013,837 A * | 12/1961 | Pessl et al. | ............ | 297/344.21 |
| 4,241,893 A * | 12/1980 | Koutsky et al. | ............ | 248/425 |
| 4,417,715 A * | 11/1983 | Edwards | ................ | 297/344.22 |
| 4,671,572 A * | 6/1987 | Young et al. | ........... | 297/344.24 |
| 5,474,353 A * | 12/1995 | Koester et al. | ........... | 296/65.07 |
| 6,027,170 A * | 2/2000 | Benz et al. | ............. | 297/344.21 |
| 6,276,750 B1 * | 8/2001 | Frisch | ..................... | 296/190.1 |
| 6,290,199 B1 * | 9/2001 | Garrido et al. | ............. | 248/424 |
| 6,513,872 B2 * | 2/2003 | Bar | ........................... | 297/232 |
| 7,219,961 B2 * | 5/2007 | Priepke et al. | ......... | 297/344.21 |
| 2004/0256894 A1 | 12/2004 | McManus et al. | | |
| 2006/0226685 A1 * | 10/2006 | Priepke et al. | ......... | 297/344.24 |

FOREIGN PATENT DOCUMENTS

DE        201 09 218 U1    2/2002
WO        WO 95/05953 A1   3/1995

* cited by examiner

*Primary Examiner*—Lori L Lyjak
(74) *Attorney, Agent, or Firm*—Pearne & Gordon LLP

(57) ABSTRACT

In a seat and a maneuvering cabin for telescopic lifts, the seat comprises means for translating, predisposed to translate the seat forwards and backwards along a determined translation direction, and means for rotating, predisposed to rotate the seat about a rotation axis. The maneuvering cabin comprises: a frame for containing and supporting the cabin; at least a transparent front surface which is solidly constrained to the frame, through which an operator can observe outside the cabin in a frontal direction; a roof comprising a transparent portion, which transparent portion is contiguous to the front surface, through which an operator can observe outside the maneuvering cabin in an upwards direction through a predetermined angle of vision, and a non-transparent reinforced portion which is contiguous to the transparent portion; a maneuvering seat located internally of the frame and positioned below the reinforced portion of the roof facing the front surface. The seat can be translated towards and away from the front surface.

4 Claims, 2 Drawing Sheets

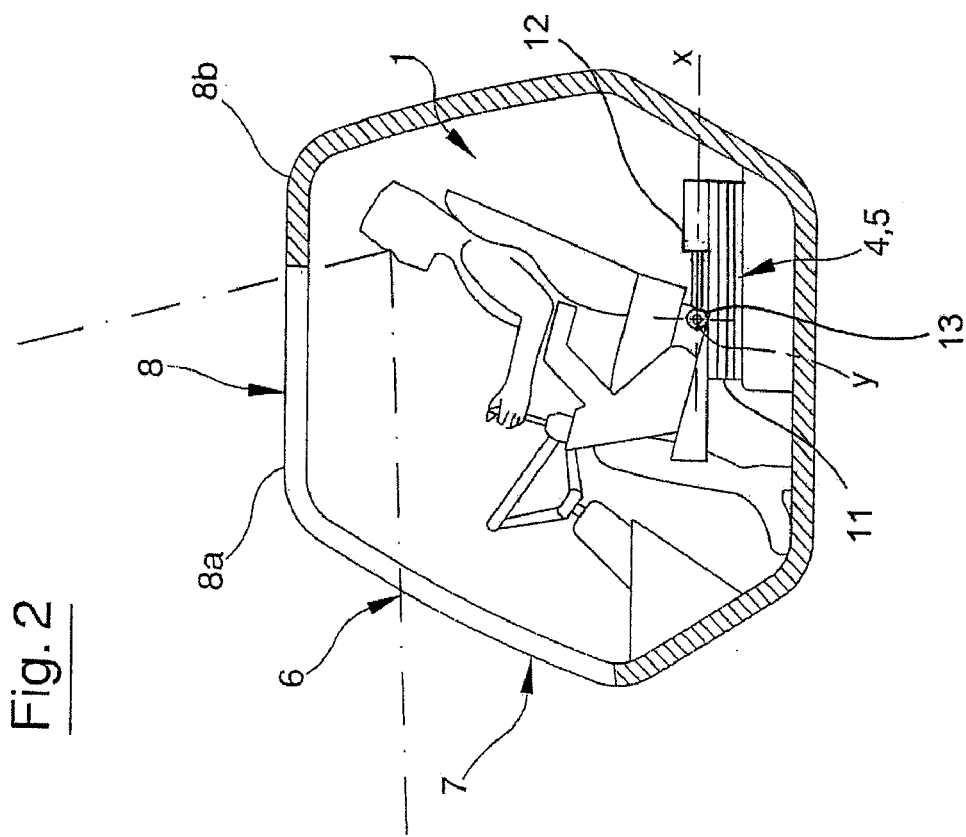
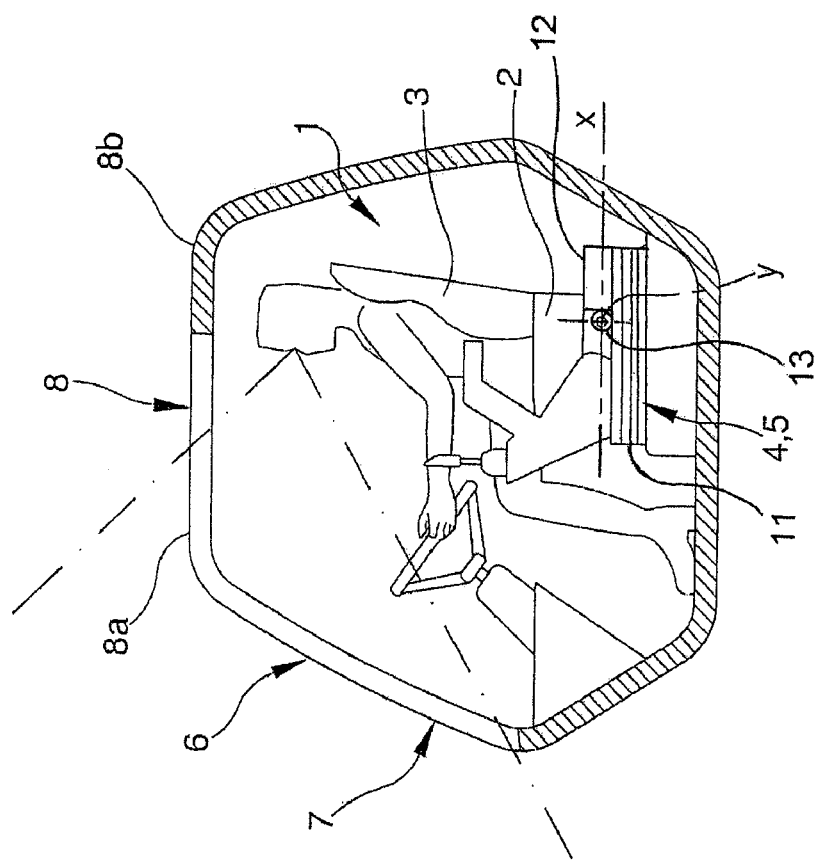
Fig. 1
Fig. 2

MANEUVERING SEAT FOR TELESCOPIC LIFTS

BACKGROUND OF THE INVENTION

The invention relates to a maneuvering seat for telescopic lifts. The invention also relates to a maneuvering cabin for telescopic lifts.

As is known, telescopic lifts exhibit a support frame for resting on the ground, to which are associated a maneuvering cabin for an operator and a telescopic arm which can rotate and extend in length in a vertical plane. The telescopic arm is provided at a free end thereof with a gripping organ by means of which objects of various types can be raised to considerable heights, in some cases more than 25 meters.

The great versatility of these work machines has meant their great success and ever-more intensive use; at the same time questions of operator safety and comfort have become more pressing.

A problem of telescopic lifts is that when the arm is extended to very great heights the operator is forced to tilt his or her head backwards into a tiring and non-ergonomic posture, especially if the situation persists for long periods and/or is repeated many times within a working day.

A solution proposed for this problem consists in equipping a controlled reclining seat for the operator. Thanks to this solution, the operator's head is brought into a correct position for viewing upwards without any need to incline the head backwards, but accessibility of the maneuvering controls of the lift can become at least partly compromised, as following rotation of the seat, the distance between controls and operator is increased. Further, the view upwards is considerably limited by the reinforced roof of the cabin, required for operator safety.

A further solution proposed consists in providing the whole maneuvering cabin with the ability to tilt backwards. This however means that the cabin does not satisfy the resistance parameters imposed by safety regulations.

The aim of the present invention is to provide a maneuvering seat which enables the operator to enjoy a sufficiently broad view upwards without having to incline his or her head backwards. A further aim of the invention is to provide a maneuvering cabin which enables the operator to obtain a sufficiently-broad upward view without having to incline his or her head backwards which exhibits resistance characteristics satisfying the set safety regulations.

The aims of the invention are attained by the maneuvering seat and cabin of the accompanying claims.

SUMMARY OF THE INVENTION

In a seat and a maneuvering cabin for telescopic lifts, the seat comprises means for translating, predisposed to translate the seat forwards and backwards along a determined translation direction, and means for rotating, predisposed to rotate the seat about a rotation axis. The maneuvering cabin comprises: a frame for containing and supporting the cabin; at least a transparent front surface which is solidly constrained to the frame, through which an operator can observe outside the cabin in a frontal direction; a roof comprising a transparent portion, which transparent portion is contiguous to the front surface, through which an operator can observe outside the maneuvering cabin in an upwards direction through a predetermined angle of vision, and a non-transparent reinforced portion which is contiguous to the transparent portion; a maneuvering seat located internally of the frame and positioned below the reinforced portion of the roof facing the front surface. The seat can be translated towards and away from the front surface.

BRIEF DESCRIPTION OF THE DRAWINGS

Further characteristics and advantages of the invention will better emerge from the detailed description that follows with reference to the accompanying figures of the drawings, given purely by way of non-limiting example, in which:

FIG. 1 is a seat and a cabin according to the present invention; the seat is in a first position thereof;

FIG. 2 is the seat and cabin of FIG. 1, with the seat in a second position thereof;

DESCRIPTION OF THE PREFERRED EMBODIMENTS

Figure 3:
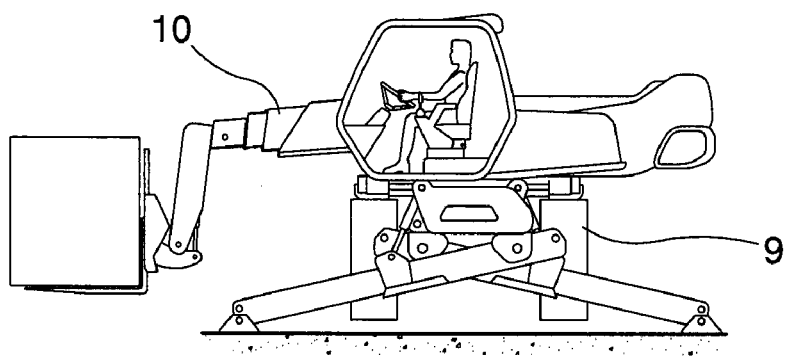
FIG. 3 is the cabin and seat of FIG. 1 associated to a telescopic lift.

With reference to the figures of the drawings, the maneuvering seat 1 of the present invention is provided with at least a seating plane and a backrest. The seat comprises means for translating 4 predisposed to translate the seat forward and backward along a determined translation direction x, and means for rotating 5, predisposed to rotate the seat about a rotation axis y. The axis of rotation y is preferably horizontal and perpendicular to the translation direction x.

The means for translating 4 and the means for rotating 5 operate a movement of the seat between at least a first position, in which the seat is at a posterior end of a translation run thereof, in a substantially erect position, and at least a second position, in which the seat is at a front end of the translation run, in a backwards-reclined position. The rotation and translation of the seat can be synchronized in any way, i.e. the seat can first translate and then rotate, or vice versa, or the rotation and the translation can occur simultaneously. The advantages of a movement of this type are obvious for a maneuvering cabin provided with a seat according to the invention.

In greater detail, the maneuvering cabin is associated to a main frame 9 of the telescopic lift to which main frame 9 a telescopic arm 10 is rotatably constrained, which telescopic arm 10 can extend and retract and rotate on a vertical plane. The cabin comprises a frame 6 predisposed to contain and support the control cabin. At least a transparent front surface 7 is solidly constrained to the frame 6. The transparent front surface 7 is typically constituted by a panel made of glass or of poly(methyl methacrylate) (sold under the trademark PLEXIGLAS). An operator can observe the space before him or her outside the cabin through the front surface 7. A roof 8 is superiorly associated to the frame 6. The roof 8 comprises a transparent portion 8a, contiguous to the front surface 7, through which the operator can observe outside the maneuvering cabin in an upwards direction, throughout a predetermined angle of vision. The roof further comprises a reinforced portion 8b, contiguous to the transparent portion 8a, which is not transparent and thus does not enable the operator to see out. This reinforced portion, the presence of which is rendered compulsory by safety regulations, is generally constituted by a sheet steel panel which has been stiffened and reinforced in order to offer precise resistance characteristics for operator protection when on-board. A maneuvering seat 1 according to the present invention is located internally of the frame 6 and positioned below the reinforced portion 8b of the roof 8.

The maneuvering seat 1 obviously faces the front surface 7. The translation of the seat 1 along the translation direction x is in a nearing and distancing direction towards and away from the front surface 7. In particular the first position of the seat 1 corresponds to a position of maximum distance between the seat and the front surface, while the second position of the seat 1 corresponds to a position of minimum distance between the seat 1 and the front surface 7.

Figure 4:
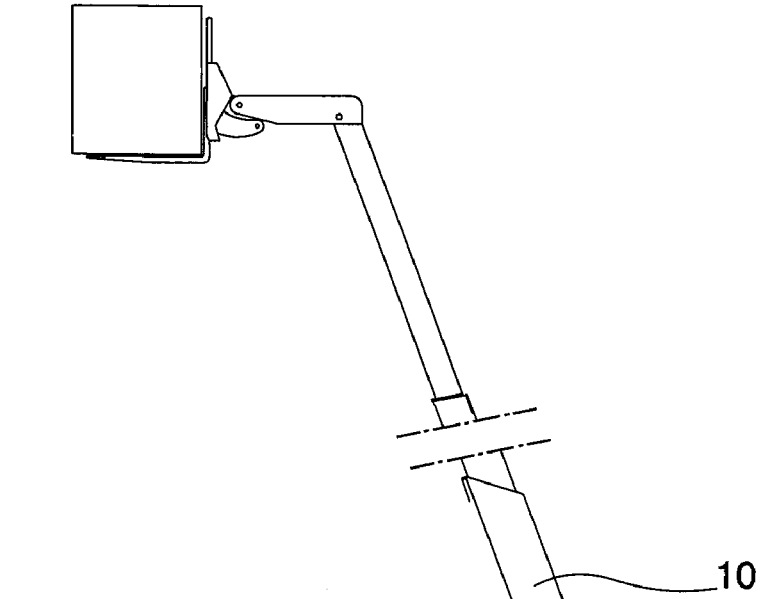
FIG. 4 is the cabin and seat of FIG. 2 associated to a telescopic lift.

As can clearly be seen in FIGS. 1 and 3, when the operator must maneuver the telescopic arm 10 in a horizontal or slightly-inclined position thereof, the seat 1 is in the first position. When the telescopic arm must be extended and inclined in an upwards direction (FIG. 4), the operator activates the means for translating 4 and the means for rotating 5 to advance and backwardly incline the seat 1, bringing the seat 1 into the second position in which, as seen clearly in FIG. 2, the view upwards is excellent and does not require unnatural torsion of the operator's neck. The advancing of the seat 1, in combination with the rotation thereof, has a double advantage. Firstly, the operator's view is not impeded by the covered and reinforced portion 8b of the roof 8; if the seat 1 were rotated backwards into the position of FIG. 1, the range of view of the operator would be limited by the reinforced portion 8b. The second advantage is that the operator can continue to use the commands in the cabin with ease, especially the steering wheel and the pedals. If the seat rotated backwards as in the position illustrated in FIG. 1, the distance between the operator's shoulders and the steering wheel and between the operator's knees and the cabin floor would increase, making it difficult for the operator to use these controls.

The means for translating 4 preferably comprise straight guides 11 and at least an electromechanical actuator 12 predisposed to activate the seat to slide along the straight guides 11. The means for rotating 5 preferably comprise a pivot which is concentric of the rotation axis y and at least an electromechanical actuator 13 predisposed to rotate the seat about the pivot. All the elements described in the present paragraph have not been illustrated in detail in the accompanying figures of the drawings as they are known elements and widely used in the field; they could also be substituted by equivalent elements.

What is claimed is:

1. A maneuvering seat for telescopic lifts, comprising means for translating, predisposed to translate the seat forwards and backwards along a determined translation direction, and means for rotating, predisposed to rotate the seat about a rotation axis wherein the rotation axis is horizontal and perpendicular to the translation direction and the means for translating and the means for rotating are predisposed to operate a movement of the seat between at least a first position thereof, in which the seat is at a posterior end of a run of the translation direction and is in a substantially erect configuration, and at least a second position, in which the seat is at a front end of the run of the translation direction, and is in a backwards-reclined configuration, the means for rotating comprising a pivot which is concentric of the rotation axis and at least an electromechanical actuator predisposed to rotate the seat about the pivot.

2. The seat of claim 1, wherein the means for translating comprise straight guides and at least an electromechanical actuator predisposed to activate the seat to slide along the straight guides.

3. A maneuvering cabin for a telescopic lift, comprising: a frame for containing and supporting the cabin; at least a transparent front surface which is solidly constrained to the frame, through which an operator can observe outside the cabin in a frontal direction; a roof comprising a transparent portion, which transparent portion is contiguous to the front surface, through which an operator can observe outside the maneuvering cabin in an upwards direction through a predetermined angle of vision, and a non-transparent reinforced portion which is contiguous to the transparent portion; a maneuvering seat located internally of the frame and positioned below the reinforced portion of the roof; wherein the maneuvering seat comprises means for translating, predisposed to translate the seat forwards and backwards along a determined translation direction, and means for rotating, predisposed to rotate the seat about a rotation axis which is horizontal and perpendicular to the translation direction and wherein the maneuvering seat faces the front surface, and the means for translating are predisposed to translate the seat towards and away from the front surface, the means for translating and the means for rotating being predisposed to operate a movement of the seat between at least a first position thereof, in which the seat is at a posterior end of a run of the translation direction and is in a substantially erect configuration, and at least a second position, in which the seat is at a front end of the run of the translation direction, and is in a backwards-reclined configuration, the means for rotating comprising a pivot which is concentric of the rotation axis and at least an electromechanical actuator predisposed to rotate the seat about the pivot.

4. The cabin of claim 3, wherein the at least a first position of the seat is a position of maximum distance between the seat and the front surface, and the at least a second position of the seat is a position of minimum distance between the seat and the front surface.

* * * * *